United States Patent
Keutz et al.

(10) Patent No.: US 7,648,165 B2
(45) Date of Patent: Jan. 19, 2010

(54) GAS BAG MODULE FOR A VEHICLE OCCUPANT RESTRAINT SYSTEM

(75) Inventors: Markus Keutz, Rossdorf (DE); Michael Deckenhoff, Duelmen (DE); Matthias Helmstetter, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 392 days.

(21) Appl. No.: 11/333,984

(22) Filed: Jan. 18, 2006

(65) Prior Publication Data
US 2006/0157962 A1   Jul. 20, 2006

(30) Foreign Application Priority Data
Jan. 20, 2005   (DE) .................. 20 2005 000 924 U

(51) Int. Cl.
*B60R 21/276* (2006.01)
(52) U.S. Cl. .................. 280/739; 280/742; 280/743.1
(58) Field of Classification Search .................. 280/726, 280/739, 742, 743.1; *B60R 21/276*
See application file for complete search history.

(56) References Cited

U.S. PATENT DOCUMENTS

| | | | |
|---|---|---|---|
| 3,747,953 A | | 7/1973 | Goes et al. |
| 3,884,499 A | * | 5/1975 | Oka et al. .................. 280/735 |
| 5,366,242 A | * | 11/1994 | Faigle et al. .................. 280/736 |
| 5,437,941 A | * | 8/1995 | Arledge et al. .................. 429/129 |
| 5,518,269 A | | 5/1996 | Storey et al. |
| 5,683,102 A | * | 11/1997 | Davis et al. .................. 280/732 |
| 5,695,214 A | * | 12/1997 | Faigle et al. .................. 280/735 |
| 5,853,192 A | * | 12/1998 | Sikorski et al. .................. 280/739 |
| 5,899,494 A | * | 5/1999 | Lane, Jr. .................. 280/739 |
| 6,039,346 A | * | 3/2000 | Ryan et al. .................. 280/736 |
| 6,273,463 B1 | * | 8/2001 | Peterson et al. .................. 280/739 |
| 6,376,971 B1 | * | 4/2002 | Pelrine et al. .................. 310/363 |
| 6,517,108 B1 | | 2/2003 | Vinton et al. |
| 6,540,257 B2 | * | 4/2003 | Magoteaux .................. 280/739 |
| 6,547,274 B2 | * | 4/2003 | Ochiai .................. 280/735 |
| 6,705,642 B1 | | 3/2004 | Serban et al. |
| 6,752,420 B2 | * | 6/2004 | Ziolo et al. .................. 280/739 |
| 6,811,183 B1 | | 11/2004 | Serban et al. |
| 6,971,671 B2 | * | 12/2005 | Schneider et al. .................. 280/739 |
| 7,516,982 B2 | * | 4/2009 | Britz .................. 280/739 |
| 2003/0214124 A1 | * | 11/2003 | DePottey et al. .................. 280/739 |
| 2003/0214125 A1 | * | 11/2003 | Schneider et al. .................. 280/739 |
| 2003/0227663 A1 | * | 12/2003 | Agrawal et al. .................. 359/265 |

(Continued)

FOREIGN PATENT DOCUMENTS

DE          2056101          5/1972

(Continued)

*Primary Examiner*—Paul N Dickson
*Assistant Examiner*—Laura Freedman
(74) *Attorney, Agent, or Firm*—Tarolli, Sundheim, Covell & Tummino LLP

(57) ABSTRACT

A gas bag module for a vehicle occupant restraint system includes a housing and a gas bag (12) accommodated in the housing. The gas bag has a gas bag wall (16). The gas bag module further includes a discharge arrangement (18) having an energetic element (22) for the selective provision of a discharge opening. The energetic element (22) is able to be activated by a control unit (20). The discharge opening is provided by material conversion of the energetic element (22).

7 Claims, 3 Drawing Sheets

U.S. PATENT DOCUMENTS

2004/0056459 A1    3/2004   Kassman et al.
2004/0130135 A1*   7/2004   Ekdahl ....................... 280/739

FOREIGN PATENT DOCUMENTS

| | | |
|---|---|---|
| DE | 10221659 | 8/2003 |
| EP | 0638466 | 2/1995 |
| GB | 2306409 | 5/1997 |
| GB | 2329364 | 3/1999 |
| WO | 2004/045919 | 6/2004 |

* cited by examiner

GAS BAG MODULE FOR A VEHICLE OCCUPANT RESTRAINT SYSTEM

TECHNICAL FIELD

The invention relates to a gas bag module for a vehicle occupant restraint system.

BACKGROUND OF THE INVENTION

From WO-A-2004/045919 a gas bag module is known including a housing and a gas bag accommodated in the housing. The gas bag module further includes a discharge arrangement having an energetic element for the selective provision of a discharge opening. The energetic element is able to be activated by a control unit. Thus, a discharge region in the gas bag wall can be opened when a reduction of the gas bag internal pressure is desired. A pyrotechnic charge in the form of a fuse is arranged directly on the discharge region, so that the discharge region burns through or is torn open mechanically after the fuse has been ignited.

Fuses for producing discharge openings are also used in the gas bag module known from GB-A-2 329 364. Here, particular regions of a reaction vessel, a manifold or a gas generator are burned through.

In the gas bag module shown in GB-A-2 306 409 a discharge opening of the gas bag is closed by a disc. A pyrotechnic charge, which is arranged on the disc, burns through a weakened section of the disc, so that a flap is formed. The flap can open because of the internal pressure of the gas bag to expose the discharge opening.

DE-A-102 21 659 shows a gas bag module in which a discharge opening is formed, after the gas bag has carried out its protective function. The discharge opening is produced in that a region of the gas bag fabric is melted by heating a filament.

It is an object of the invention to provide a gas bag module which makes possible a rapid and controlled provision of a discharge opening.

BRIEF SUMMARY OF THE INVENTION

According to the invention, a gas bag module for a vehicle occupant restraint system includes a housing and a gas bag accommodated in the housing. The gas bag has a gas bag wall. The gas bag module further includes a discharge arrangement having an energetic element for the provision of a discharge opening. The energetic element is able to be activated by a control unit. The discharge opening is provided by material conversion of the energetic element.

The provision of a discharge opening according to the invention includes the primary production of a discharge opening or the exposure or enlargement of a discharge opening which is already present in the gas bag wall or in a rigid component of the gas bag module (housing, gas generator, covering cap etc.). An energetic element is understood to mean an energy-releasing element which is able to be activated. After its activation (igniting, lighting, initiating) the energetic element converts itself through detonation, burning, melting or the like (and possibly also destroys or damages adjacent material), in order to produce, expose or enlarge a discharge opening.

According to a particular embodiment of the invention, the energetic element is part of an electrolytic capacitor structure. The term "electrolytic capacitor structure" is not to be limited here to commercially available electrolytic capacitors, but rather is to include all capacitor-like structures having two opposite plates (in a broader sense) and an electrolyte arranged therebetween.

DETAILED DESCRIPTION OF THE PREFERRED EMBODIMENTS

Figure 1:
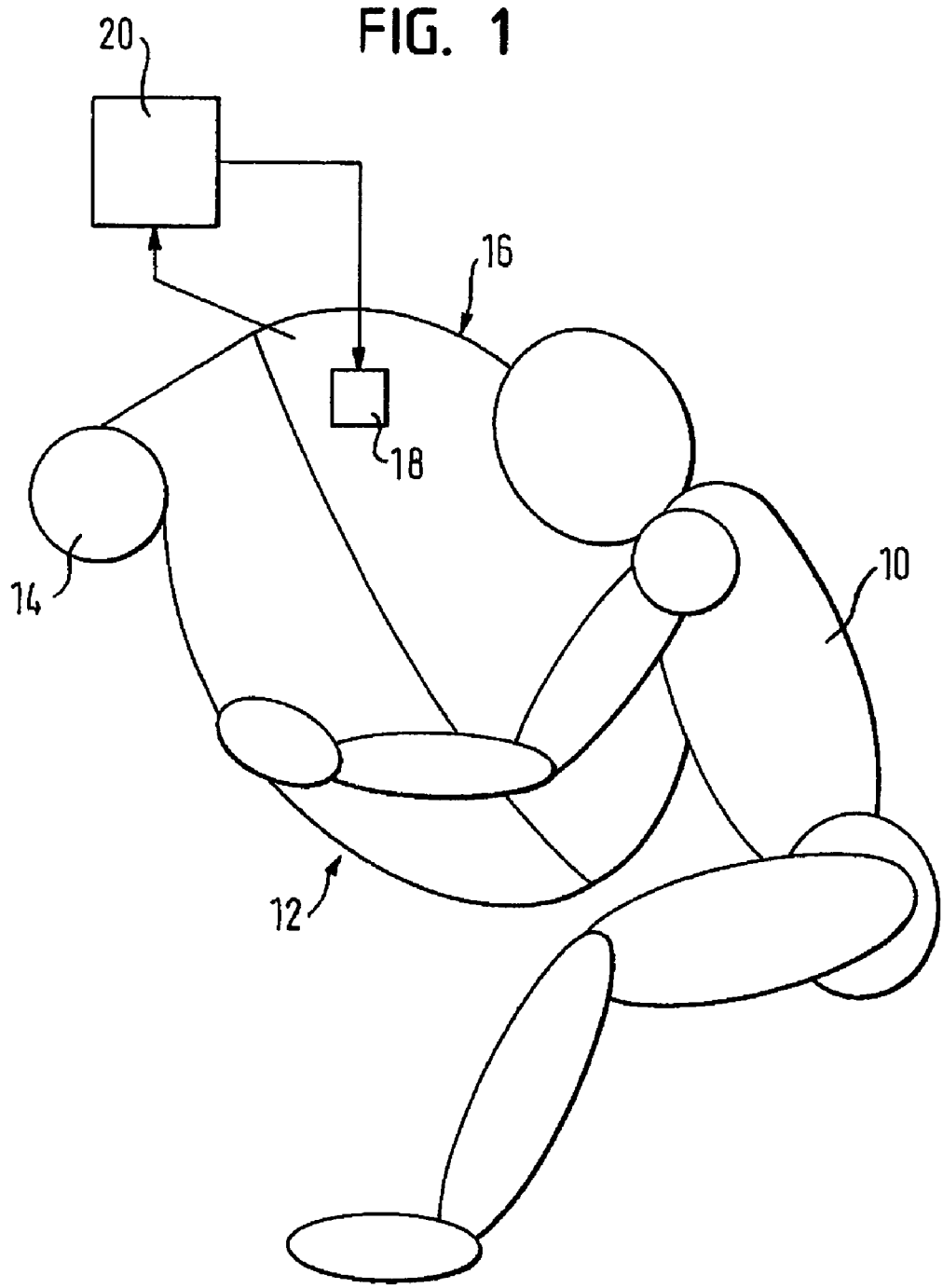
FIG. 1 shows diagrammatically a gas bag module according to the invention, with an unfolded gas bag in the case of stress.

In FIG. 1 a vehicle occupant 10 is shown, who is plunging into an inflated gas bag 12 of a vehicle occupant restraint system. The gas bag 12, which has unfolded itself out from the housing of a gas bag module 14, has a gas bag wall 16 on which an electrically controllable discharge arrangement 18 is arranged. The discharge arrangement 18 serves for the selective provision of a discharge opening through which gas can escape from the gas bag 12. The discharge arrangement 18 has an energetic element which is connected directly or indirectly with an electronic control 20, i.e. the energetic element 18 is able to be activated by the electronic control 20.

In the following description of example embodiments of the invention, the same reference numbers are used for parts which have the same or similar functions.

Figure 2:
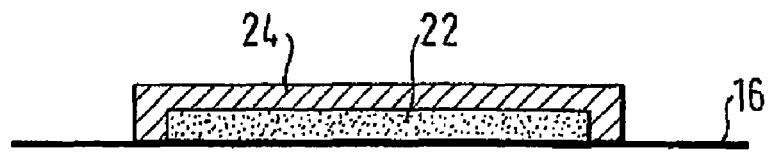
FIGS. 2 to 10 show diagrammatically various embodiments of the discharge arrangement.

FIG. 2 shows the basic structure of a discharge arrangement 18 according to a first embodiment. An energetic element 22 in the form of an explosive, pyrotechnic (combustible) material, or a material which melts at high speed, is covered by a protective layer 24 and applied at a suitable location directly on the gas bag wall 16. The protective layer 24 may, for example, be a patch of fabric sewn by its edge to the gas bag wall 16, or it may be a coating applied directly on the energetic element 22. An ignition pill or the like may also be used as energetic element 22. The electric lead via which the discharge arrangement 18 is connected with the electronic control 20 is not illustrated here.

On activation of the discharge arrangement 18, the energetic element 22 is ignited, lit or initiated, which leads to a damage or immediate destruction of the adjacent gas bag wall 16 by blasting (open), burning or melting. In this way, a discharge opening is created in the gas bag wall 16, through which gas can emerge from the gas bag 12.

Figure 3:
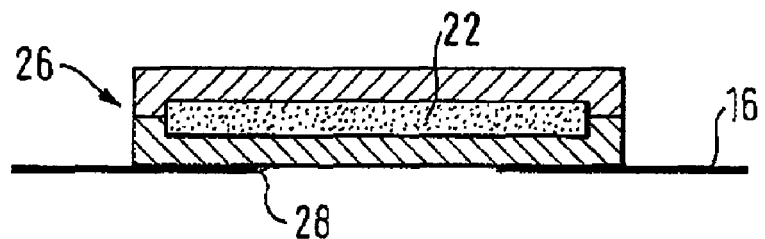

In the variant shown in FIG. 3, the energetic element 22 is part of a prefabricated unit 26 which is fastened to the gas bag wall 16 in a suitable manner, e.g. by sewing in or glueing. The prefabricated unit 26 may comprise, for example, a piece of fabric, a piece of plastic/silicon, or a foil, into which an energetic element 22 is integrated. The prefabricated unit 26 is arranged such that it at least partially covers a discharge opening 28 which is already present in the gas bag wall 16. In this case, through the activation of the discharge arrangement 18, especially the part of the prefabricated unit 26 which is covering the discharge opening 28 is damaged or destroyed to such an extent that the discharge opening 28 is thereby at least partially exposed.

Figure 4:

FIG. 4 shows a second embodiment, in which a particular region of the gas bag wall 16 is formed from a special fabric piece 30. The fabric piece 30, which in this embodiment represents the energetic element 22, consists of an explosive or combustible material, e.g. an azotic acid ester of a fabric material. Thus, by igniting or lighting the fabric piece 30, a discharge opening can be produced directly in the gas bag wall 16.

Figure 5:
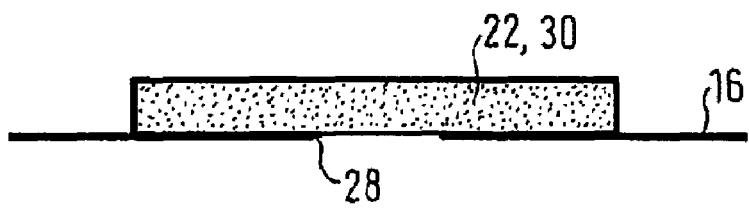

In the variant shown in FIG. 5, in a similar manner to the variant of FIG. 3, a discharge opening 28 is already formed in the gas bag wall 16. The discharge opening 28 is covered by a separate fabric piece 30, having the characteristics previously described. The fabric piece 30 is fastened to the gas bag wall 16 in a suitable manner. The destruction of the fabric piece 30 by detonation or burning exposes the discharge opening 28.

Figure 6:
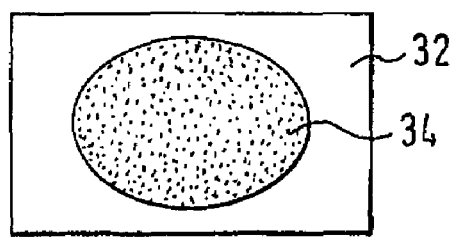
Figure 7:
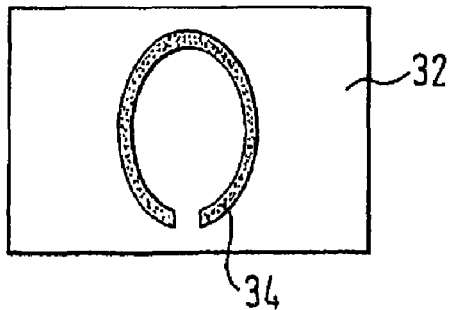

FIGS. 6 and 7 show a third embodiment of the invention. A specific region of a fabric piece 32 is impregnated with an explosive or pyrotechnic material 34. By application of the material on the surface (FIG. 6), the entire impregnated region becomes the discharge opening. The material 34 may, however, also be applied as shown in FIG. 7, such that a flap is produced in the fabric piece 32. As in the previously described embodiments, the fabric piece 32 may again be part of the gas bag wall 16 or may be a separate fabric piece which covers a discharge opening 28 formed in the gas bag wall 16. According to the invention, provision may also be made that the housing or other rigid components of the gas bag module 14 have as component(s) one or more energetic elements 22.

Figure 8:
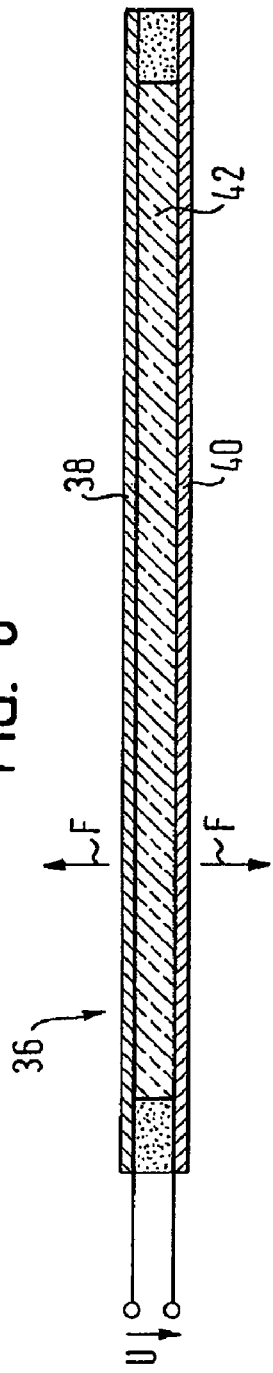

A fourth embodiment of the discharge arrangement 18 is shown in FIG. 8. A portion of the module housing has a capacitor-like structure in a particular region. In this region, the housing wall 36 is formed from an inner and an outer housing shell 38 and 40, respectively, which are spaced apart from each other. The sides of the housing shells 38, 40 which face each other are metallized, e.g. by the vapour-coating of aluminum or by lamination of an aluminum foil, and represent the plates of the capacitor. An electrolyte is situated in the intermediate space 42 between the housing shells 38, 40. The intermediate space 42 is sealed by the welding or glueing of the housing shells, so that the electrolyte can not escape. The two capacitor plates are connected to a power supply, the connection polarity of the capacitor being intentionally reversed.

Figure 9:
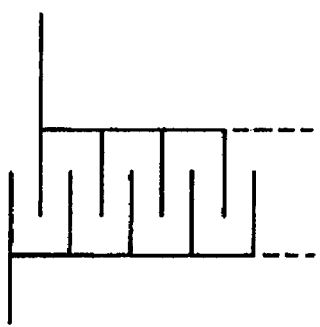

If a discharging of gas from the gas bag 12 of the vehicle occupant restraint system is required, the power supply is switched on by the electronic control 20. Owing to the reversed polarity of the electrolytic capacitor, a removal of the oxide layer (dielectric) of the capacitor and a rapid heating of the electrolyte, serving here as energetic element 22, with the formation of gas occurs. This leads to the capacitor exploding, i.e. the two housing shells 38, 40 are torn apart by the gas pressure. The forces acting here, and the speed of the process, can be adjusted through the selection of the capacitor area (size of the capacitor plates), of the distance between the plates, of the electrolyte and of the extent of the reversed polarization voltage. In case of a restricted space, the effective area of the capacitor plates can also be enlarged by a multi-layered capacitor structure, as shown diagrammatically in FIG. 9.

Figure 10:
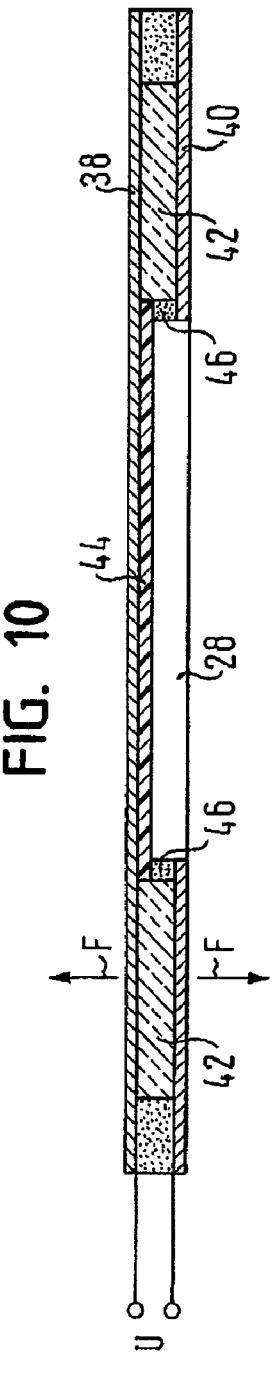

In the variant embodiment shown in FIG. 10, two capacitor structures are provided, between which a membrane 44 is arranged. The membrane 44 closes a discharge opening 28 which is already present in the housing wall. Through the explosion of the two capacitor structures, the anchoring 46 of the membrane 44 is destroyed, so that the discharge opening 28 is exposed.

A capacitor structure can of course also be formed in another suitable component of the gas bag module 12. Instead of such capacitor structures which are integrated into the components of the gas bag module 12, prefabricated electrolytic capacitors can of course also be used, which are fastened to a particular component of the module 12, e.g. by clipping on or glueing on.

The attempts described for the selective provision of a discharge opening or details of these attempts are also able to be combined with each other at the discretion of the specialist in the art.

The invention claimed is:

1. A gas bag module for a vehicle occupant restraint system, the gas bag module including a housing and a gas bag accommodated in the housing, the gas bag having a gas bag wall, the gas bag module further including a discharge arrangement having an energetic element applied directly on the gas bag wall for the selective provision of a discharge opening in the gas bag, the energetic element having an energetic fabric piece with a nitric acid ester and being able to be activated by a control unit, the fabric piece being impregnated with an explosive or pyrotechnic material, the discharge opening being provided by material conversion of the energetic element.

2. The gas bag module according to claim 1, wherein the energetic element is covered by a protective layer.

3. The gas bag module according to claim 1, wherein the energetic element is part of a prefabricated unit which is applied on the gas bag wall.

4. The gas bag module according to claim 3, wherein the prefabricated unit at least partially covers a discharge opening formed in the gas bag wall.

5. A gas bag module for a vehicle occupant restraint system, the gas bag module including a housing and a gas bag accommodated in the housing, the gas bag having a gas bag wall, the gas bag module further including a discharge arrangement having an energetic element for the selective provision of a discharge opening in the gas bag, the energetic element being part of the gas bag wall and having an energetic fabric piece with a nitric acid ester, the energetic element being able to be activated by a control unit, the fabric piece being impregnated with an explosive or pyrotechnic material, the discharge opening being provided by material conversion of the energetic element.

6. A gas bag module for a vehicle occupant restraint system, the gas bag module including a housing and a gas bag accommodated in the housing, the gas bag having a gas bag wall, the gas bag module further including a discharge arrangement having an energetic element applied directly on the gas bag wall for the selective provision of a discharge opening in the gas bag, the energetic element having a fabric piece which is impregnated with an explosive or pyrotechnic material, the energetic element being able to be activated by a control unit, wherein the discharge opening being provided by material conversion of the energetic element.

7. A gas bag module for a vehicle occupant restraint system, the gas bag module including a housing and a gas bag accommodated in the housing, the gas bag having a gas bag wall, the gas bag module further including a discharge arrangement having an energetic element for the selective provision of a discharge opening in the gas bag, the energetic element being part of the gas bag wall and having an energetic fabric piece which is impregnated with an explosive or pyrotechnic material, the energetic element being able to be activated by a control unit, wherein the discharge opening being provided by material conversion of the energetic element.

* * * * *

UNITED STATES PATENT AND TRADEMARK OFFICE
CERTIFICATE OF CORRECTION

PATENT NO.      : 7,648,165 B2                           Page 1 of 1
APPLICATION NO. : 11/333984
DATED           : January 19, 2010
INVENTOR(S)     : Keutz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Sixteenth Day of November, 2010

David J. Kappos
*Director of the United States Patent and Trademark Office*